US011945586B2

(12) United States Patent
Tsai (10) Patent No.: US 11,945,586 B2
(45) Date of Patent: Apr. 2, 2024

(54) COMPACT AIRCRAFT CONTROL SURFACE TRACK MECHANISM

(71) Applicant: The Boeing Company, Chicago, IL (US)

(72) Inventor: Kevin Tsai, Seattle, WA (US)

(73) Assignee: The Boeing Company, Arlington, VA (US)

( * ) Notice: Subject to any disclaimer, the term of this patent is extended or adjusted under 35 U.S.C. 154(b) by 63 days.

(21) Appl. No.: 17/744,208

(22) Filed: May 13, 2022

(65) Prior Publication Data

US 2023/0365249 A1    Nov. 16, 2023

(51) Int. Cl.
*B64C 9/06* (2006.01)
*B64C 1/00* (2006.01)
*B64C 5/10* (2006.01)
*B64C 9/02* (2006.01)

(52) U.S. Cl.
CPC .............. *B64C 9/06* (2013.01); *B64C 1/0009* (2013.01); *B64C 5/10* (2013.01); *B64C 9/02* (2013.01)

(58) Field of Classification Search
CPC ........... B64C 9/06; B64C 1/0009; B64C 5/10; B64C 9/02
See application file for complete search history.

(56) References Cited

U.S. PATENT DOCUMENTS

| | | | | |
|---|---|---|---|---|
| 8,276,842 B2 * | 10/2012 | Kracke | ................... | B64C 13/28 244/99.2 |
| 9,180,962 B2 * | 11/2015 | Moser | ....................... | B64C 9/06 |
| 9,771,141 B2 * | 9/2017 | Moser | ....................... | B64C 9/24 |
| 10,040,540 B2 * | 8/2018 | Bishop | ...................... | B64C 9/16 |
| 11,192,631 B2 * | 12/2021 | Schlipf | ...................... | B64C 3/50 |
| 11,292,582 B2 * | 4/2022 | Budnitsky | ................ | B64C 9/16 |
| 2011/0290946 A1 * | 12/2011 | Peirce | ....................... | B64C 9/22 244/213 |
| 2014/0042276 A1 * | 2/2014 | Parker | ...................... | B64C 9/02 244/214 |
| 2018/0162516 A1 * | 6/2018 | Brown | .................. | F16H 49/001 |
| 2021/0101671 A1 * | 4/2021 | Tsai | .......................... | B64C 9/02 |

FOREIGN PATENT DOCUMENTS

| | | | | |
|---|---|---|---|---|
| EP | 2116467 A1 * | 11/2009 | ............... | B64C 9/02 |
| EP | 3643619 A1 * | 4/2020 | ......... | B64D 45/0005 |

* cited by examiner

*Primary Examiner* — Assres H Woldemaryam
(74) *Attorney, Agent, or Firm* — HANLEY, FLIGHT & ZIMMERMAN, LLC (57) ABSTRACT

A compact aircraft control surface track mechanism is disclosed. A disclosed example aerodynamic body includes a support structure, a control surface movable relative to the support structure, the control surface including at least two rollers spaced apart along at least a spanwise direction of the aerodynamic body, and at least two tracks associated with the support structure, wherein a first track is to guide a first roller along a first movement pathway, and wherein a second track is to guide a second roller along a second movement pathway shaped differently than the first movement pathway.

20 Claims, 6 Drawing Sheets

COMPACT AIRCRAFT CONTROL SURFACE TRACK MECHANISM

FIELD OF THE DISCLOSURE

This disclosure relates generally to aircraft control surfaces and, more particularly, to a compact aircraft control surface track mechanism.

BACKGROUND

Aircraft employ control surfaces along the leading and trailing edges of the wings. For example, control surfaces along the leading edge of a wing are referred to as leading edge slats and high lift devices along the trailing edge of a wing are referred to as trailing edge flaps. The control surfaces are actuated to move relative to the wing to change the aerodynamic lift of the wing during takeoff and landing. Each of the control surfaces is actuated by actuators that utilize one or more drive mechanisms operatively coupled to the wing.

SUMMARY

An example aerodynamic body includes a support structure, a control surface movable relative to the support structure, the control surface including at least two rollers spaced apart along at least a spanwise direction of the aerodynamic body, and at least two tracks associated with the support structure, wherein a first track is to guide a first roller along a first movement pathway, and wherein a second track is to guide a second roller along a second movement pathway shaped differently than the first movement pathway.

An example method of moving a control surface of an aerodynamic body relative to a support structure of the aerodynamic body includes moving a first roller of the control surface along a first movement pathway defined by a first track, and moving a second roller of the control surface along a second movement pathway shaped differently than the first movement pathway, the second movement pathway defined by a second track, the second roller displaced from the first roller along at least along a spanwise direction of the aerodynamic body.

An example system includes a roller assembly on a control surface of a wing, the roller assembly including an inner roller on an intermediate portion of the control surface, an outer roller on a spanwise end of the control surface, and mounts to support and position the inner and outer rollers on the control surface. The example system also includes a track assembly on a support structure of the wing, the track assembly including a first track to guide the inner roller along a first movement pathway, and a second track to guide the outer roller along a second movement pathway that is shaped differently from the first movement pathway.

In general, the same reference numbers will be used throughout the drawing(s) and accompanying written description to refer to the same or like parts. The figures are not to scale. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections.

DETAILED DESCRIPTION

A compact aircraft control surface track mechanism is disclosed. Aerodynamic structures of aircraft employ control surfaces that are moved to change an aerodynamic lift thereof. Each of the control surfaces is actuated by one or more actuators operatively coupled to drive mechanisms. In known systems, some control surfaces can require mechanisms that are relatively large and, thus, can consume a significant volume on the wing. As a result, in these known systems, a corresponding drag coefficient can be relatively large due to a relatively large overall size of components/assemblies related to the mechanisms, such as fairings that enshroud or cover the mechanisms, and, thus, significant fuel consumption and costs may be encountered.

Examples disclosed herein can significantly reduce drag of an aircraft by enabling relatively compact (e.g., relatively small in size) structures and/or components associated with control surface movement. Further, examples disclosed herein can also reduce the weight, complexity and/or the cost of components typically associated with movement of a control surface, such as a fairing mounted to a wing, thereby resulting in reduced fuel consumption and costs. Examples disclosed herein can also be easily installed and assembled and, as a result, can reduce manufacturing, service and/or installation lead-times.

Examples disclosed herein include an aerodynamic body (e.g., a wing) with a support structure (e.g., a support frame, a wing spar, etc.), and a control surface (e.g., a flap) movable relative to the support structure such that the control surface includes at least two rollers spaced apart and/or displaced along at least along a spanwise direction of the aerodynamic body. According to examples disclosed herein, at least two tracks are associated with (e.g., mounted to, positioned on, etc.) the support structure. A first track is to guide a first roller along a first movement pathway, and, likewise, a second track is to guide a second roller along a second movement pathway shaped differently than the first movement pathway.

In some examples, the control surface includes four rollers such that two of the rollers are positioned at opposing spanwise ends (e.g., inboard and outboard ends, lateral ends, etc.) of the control surface and two of the rollers are positioned at an intermediate portion (e.g., a central portion or region) of the control surface. In some such examples, two actuators are positioned proximate the two rollers at the intermediate portion (e.g., the two actuators drive the two rollers at the intermediate portion). As used herein, "differently shaped" movement pathways means that the movement pathways in question differ from each other in at least one dimensional aspect. As such, in some examples, the aforementioned first movement pathway has different curvature (e.g., sharper splines, different inflection points, than the second movement pathway). Further, in some examples, the first movement pathway and the second movement pathway have different path lengths (e.g., the first movement pathway and the second movement pathway have the same or similar path shapes with different path lengths).

Figure 1:
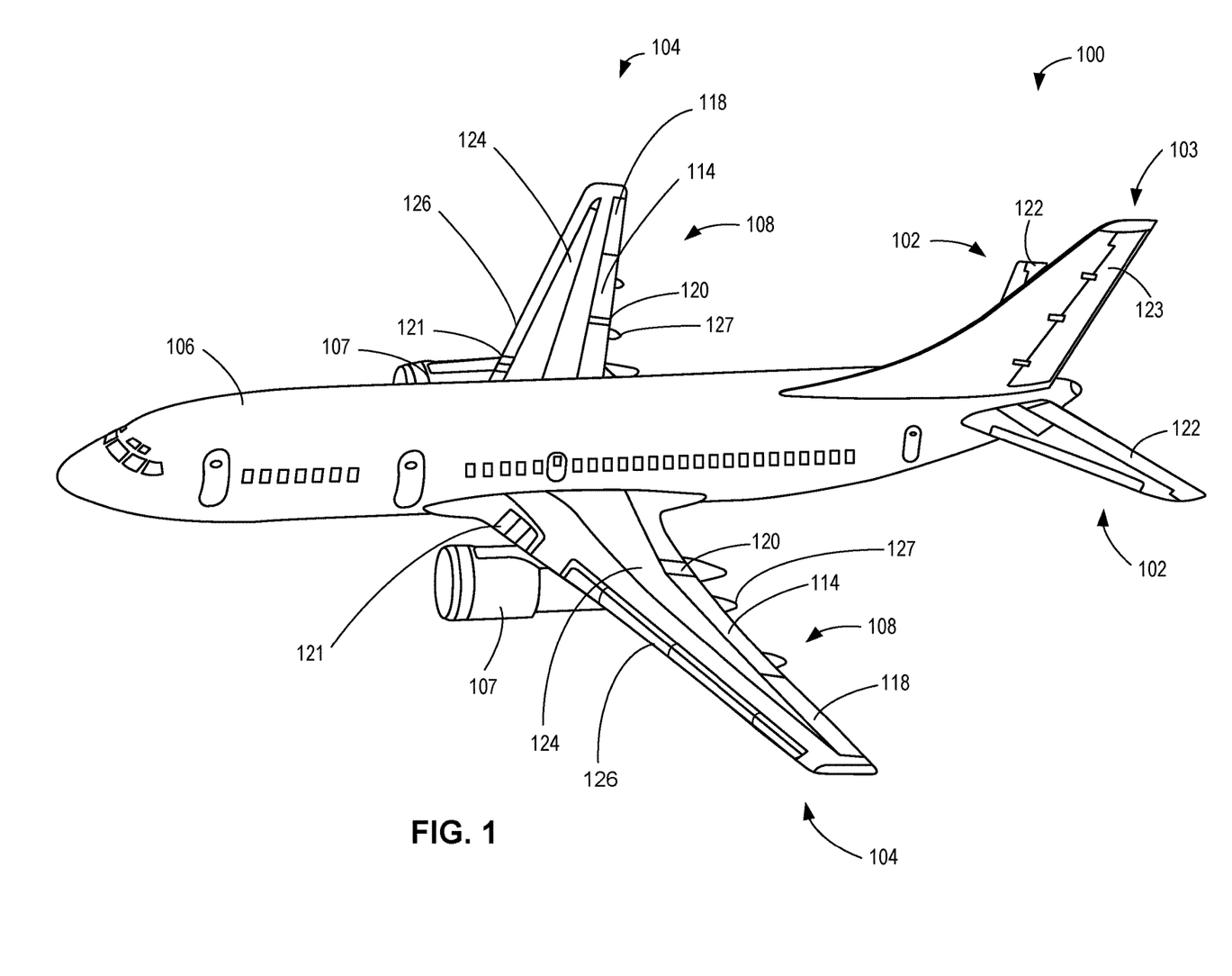
FIG. 1 is an aircraft in which examples disclosed herein can be implemented.

FIG. 1 illustrates an example aircraft 100 in which examples disclosed herein can be implemented. In the illustrated example, the aircraft 100 includes horizontal tails 102, a vertical tail 103 and wings (e.g., fixed wings) 104 attached to a fuselage 106. The wings 104 of the illustrated example have engines 107, and control surfaces (e.g., flaps, ailerons, tabs, etc.) 108, some of which are located at a trailing edge or a leading edge of the wings 104. The control surfaces 108 may be displaced or adjusted (e.g., deflected, etc.) to provide lift during takeoff, landing and/or flight maneuvers. In some examples, the control surfaces 108 are operated (i.e., displaced) independently of one another. The example control surfaces 108 include trailing edge flaps (e.g., rotatable flaps) 114, ailerons 118, flaperons 120, and leading edge flaps 121. In this example, the horizontal tails 102 include elevators 122 and the vertical tail 103 includes a rudder 123. The wings 104 also define upper and lower surfaces (e.g., upper and lower sides, upper and lower aerodynamic surfaces, etc.) 124, 126, respectively, and include fairings 127.

To control flight of the aircraft 100, the control surfaces 108 alter the lift and pitch of the aircraft 100. The control surfaces 108 of the illustrated example also play a role in controlling the speed of the aircraft 100. Any of the control surfaces 108 of the illustrated example may be independently moved (e.g., independently deflected) to control the load distribution in different directions over the wings 104, thereby directing movement of the aircraft 100. In some examples, during cruise of the aircraft 100, the control surfaces 108 are moved to reduce the drag of the aircraft 100.

Examples disclosed herein may be applied to any of the control surfaces 108, the flaps 121, the flaps 114, the ailerons 118, the flaperons 120, the tails 102, 103, the wings 104, the fuselage 106, the engines 107 and/or any other exterior or outboard structure (e.g., a horizontal stabilizer, a wing strut, an engine strut, a canard stabilizer, etc.) of the aircraft 100. In other words, examples disclosed herein can be applied to any appropriate control surface. Additionally or alternatively, in some examples, the fuselage 106 has control surfaces, which may be deflected, to alter the flight maneuvering characteristics during cruise, landing and/or takeoff of the aircraft 100.

In this example, the fairings 127 house and/or enclose mechanisms, components and/or assemblies that are utilized for moving at least some of the control surfaces 108. Examples disclosed herein can reduce sizes of the fairings 127, thereby reducing a drag coefficient of the aircraft 100 and/or the wing 104 and, thus, increasing a fuel efficiency of the aircraft 100.

Figure 2:
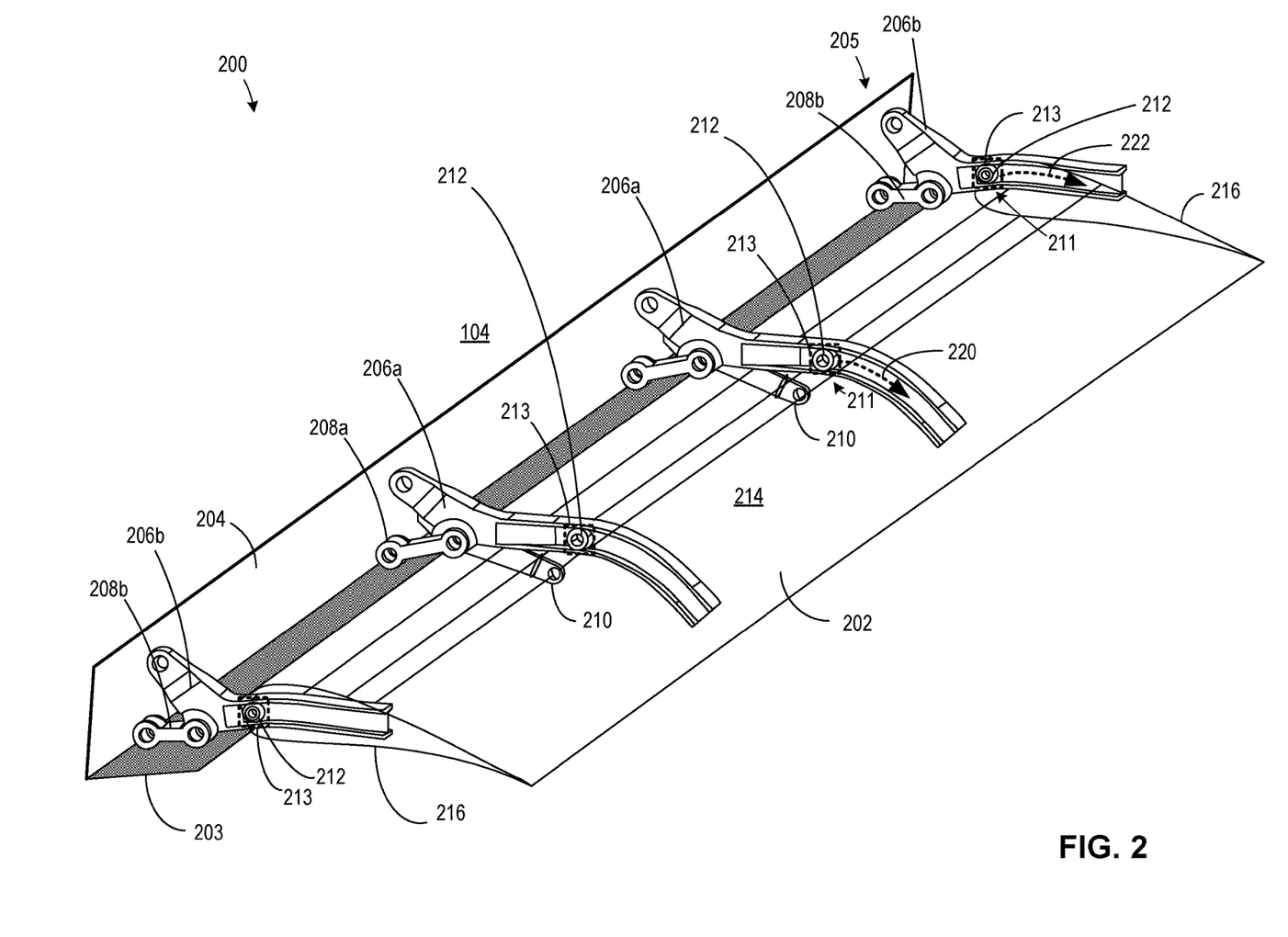
FIG. 2 is a perspective view of an example aerodynamic body in accordance with teachings of this disclosure.

FIG. 2 is a perspective view of an example aerodynamic body 200 in accordance with teachings of this disclosure. The aerodynamic body 200 of the illustrated example can be implemented on any aerodynamic structure, such as the wing 104, and/or a surface of the aircraft 100. The example aerodynamic body 200 includes a control surface 202, which may be implemented by any of the trailing edge flaps (e.g., rotatable flaps) 114, the ailerons 118, and/or the flaperons 120 depicted in FIG. 1, and a lower wing skin 203. The example control surface 202 is supported and positioned by a support structure 204, which is a spar of the wing 104 shown in FIG. 1. The example aerodynamic body 200 also includes a track assembly 205 with tracks (e.g., track components, guides, etc.) 206 (hereinafter 206a, 206b, etc.), links 208 (hereinafter 208a, 208b, etc.) and actuators (e.g., flap rotation actuators, flap translation actuators, etc.) 210. In this example, the control surface 202 is rotationally coupled to the track assembly 205 and/or the tracks 206. Further, a roller assembly 211 includes rollers 212 and mounts 213, which support and/or position the rollers 212. In particular, the example mounts 213 rotationally couple the rollers 212 to the control surface 202 to enable the rollers 212 to rotate when being at least partially captivated and/or constrained in the corresponding track 206.

In the illustrated view of FIG. 2, four of the tracks 206 are implemented on the aerodynamic body 200. In this particular example, the inner tracks 206a are positioned on an intermediate portion (e.g., a central portion, a mid-portion, etc.) 214 of the aerodynamic body 200 while the outer tracks 206b are placed on or proximate spanwise ends (e.g., lateral ends, side ends, etc.) 216 of the control surface 202. However, any other appropriate arrangement or number (e.g., two, three, five, six, seven, etc.) of the tracks 206 can be implemented instead. In some examples, a single one of the inner tracks 206a is implemented on the intermediate portion 214 of the aerodynamic body 200 while one or two of the outer tracks 206b are implemented on at least one of the spanwise ends 216.

To move the control surface 202 (e.g., pivot and/or translate the control surface 202), the actuators 210 are provided with a signal, thereby causing extension or retraction thereof. In the illustrated example of FIG. 2, the actuators 210 are positioned relatively close to the inner tracks 206a on the intermediate portion 214 of the control surface 202. As a result, the control surface 202 is generally driven by the actuators 210 at or proximate the inner tracks 206a. In turn, the outer tracks 206b guide movement of the control surface 202 as the control surface 202 is driven by the actuators 210. In some examples, the outer tracks 206b can stabilize the control surface 202 during driven movement thereof.

To reduce a drag coefficient of the aerodynamic body 200 by reducing a necessitated size of components associated with the control surface 202 (e.g., the fairing 127), each of the tracks 206a, 206b guides a respective one of the rollers 212 while the tracks 206a, 206b are shaped different to one another. In this particular example, each of the tracks 206a guides a respective one of the rollers 212 along a first movement pathway 220 and, likewise, each of the tracks 206b guides a respective one of the rollers 212 along a second movement pathway 222 that is different from the first movement pathway 220. In some examples, the first movement pathway 220 and the second movement pathway 222 have a different curvature from one another (e.g., the track 206a has a greater curvature than the track 206b). Additionally or alternatively, the first movement pathway 220 has a longer overall length than the second movement pathway 222.

To advantageously control movement of the control surface 202, as mentioned above, the first movement pathway 220 and the second movement pathway 222 have different shapes and/or geometries. In particular, the different shapes and/or geometries enable relatively complex motion of the control surface 202 by separating different portions of an overall movement path of the control surface 202 between the tracks 206a, 206b. In contrast, for such a complex motion, known implementations typically require heavier and more complicated mechanisms. In particular, known implementations can require complicated linkage designs, tight tolerances and/or complex actuation for such a motion of the control surface 202. Even further, known implementations can sometimes utilize multiple rollers in a track, which can be prone to binding and/or other reliability issues. Thus, in contrast to known systems, examples disclosed herein enable compact components that can enable smaller fairings, for example. Further, use of a single roller in a track enables greater reliability and relatively easier assembly, amongst other advantages of examples disclosed herein.

According to examples disclosed herein, a pivoting motion of the control surface 202 is caused by offset ones of the rollers 212 that support the control surface 202 traversing the tracks 206a, 206b, which have the same or similar curvature but with different lengths. For example, as the first roller 212 (e.g., a forward one of the rollers 212) engages curvature of the track 206b, the second roller 212 engages curvature of the track 206a (e.g., the roller 212 in an aft direction of the roller 212 engaging the track 206b). The second roller 212 engaging the track 206a causes a first portion of the control surface 202 to pivot downward. In turn, a second portion of the control surface 202 supported by the roller 212 engaging the track 206b also pivots downward (in the view of FIG. 2). In some examples, the inner track 206a exhibits less curvature closer to its proximal end and greater curvature closer to its distal end.

In some examples, the rollers 212 associated with the tracks 206a are positioned in an aft or fore direction relative to the rollers 212 associated with the tracks 206b. Additionally or alternatively, the first movement pathway 220 has a greater curvature than the second movement pathway 222. In some examples, the second movement pathway 222 follows the curvature of the first movement pathway 220, but includes a shorter overall path length. In some examples, the tracks 206a, 206b, as well as the rollers 212, are at least partially composed of steel (e.g., stainless steel), titanium or aluminum, etc. However, any other appropriate material can be implemented instead. In some examples, the link 208a and the link 208b have different lengths. In other examples, the link 208a and the link 208b have identical lengths.

Figure 3:
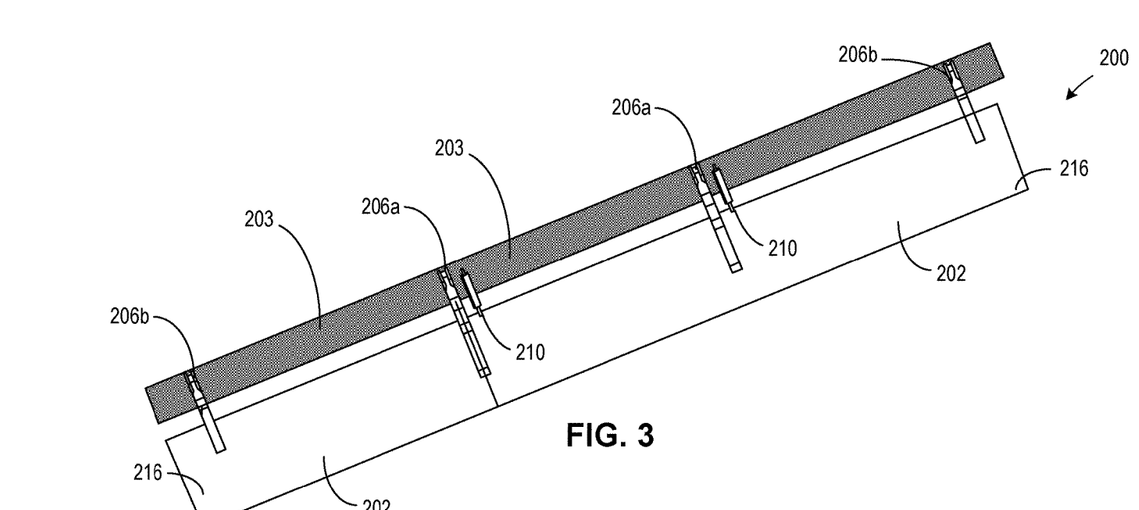
FIG. 3 is a top view of a portion of the example aerodynamic body of FIG. 2.

FIG. 3 is a top view of a portion of the example aerodynamic body 200 of FIG. 2. In the illustrated view of FIG. 3, an overall example spatial arrangement of features and/or components of the aerodynamic body 200 is depicted. In this example, the inner tracks 206a of the support structure 204 (shown in FIG. 2) are positioned proximate or aligned with the actuators 210 while the outer tracks 206b of the support structure 204 shown in FIG. 2 are positioned proximate or aligned with the spanwise ends 216 of the control surface 202. Further, the lower wing skin 203 is depicted positioned relative to the control surface 202. Accordingly, the example control surface 202 is driven near the inner tracks 206a. In some examples, only a single one of the actuators 210 is implemented to drive motion of the control surface 202. In some such examples, the actuator 210 can be centrally positioned related to the inner tracks 206a and/or both of the spanwise ends 216 (e.g., the actuator 210 is equidistant from the spanwise ends 216).

Figure 4:
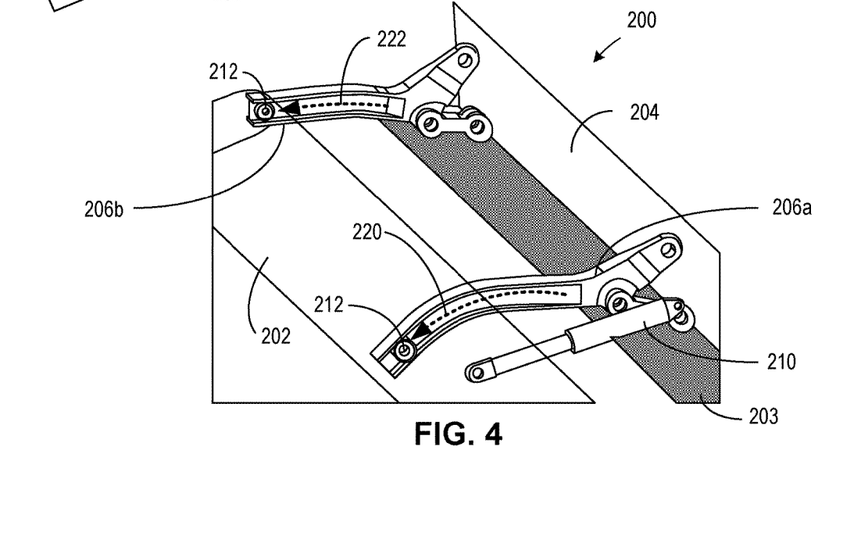
FIG. 4 is a top/side bottom perspective view of a portion of the example aerodynamic body of FIG. 2.

FIG. 4 is a detailed top/side perspective view of a portion of the example aerodynamic body 200 of FIG. 2. In the illustrated example of FIG. 4, the actuator 210 is rotationally and/or pivotably coupled to the support structure 204 and the control surface 202. In this example, the actuator 210 is implemented as a linear actuator that is extended or retracted to move the control surface 202 relative to the support structure 204, thereby causing the rollers 212 to move along the respective ones of the tracks 206a, 206b. However, any other appropriate movement mechanism or actuation device can be implemented instead, such as, but not limited to, a solenoid, a rotational actuator, a motor, etc. In some examples, a fairing (e.g., the fairing 127) associated with the control surface 202 is moved with the movement of the actuator 210 and/or the control surface 202. In particular, links, such as the example links 208a, 208b and/or a linkage mechanism/component(s) associated therewith couples motion of the control surface 202 with the aforementioned fairing.

In this example, the inner track 206a is depicted having a different shape from the outer track 206b. In other words, according to examples disclosed herein, the first movement pathway 220 is geometrically distinct from the second movement pathway 222. Particularly, the first movement pathway 220 has a greater overall curvature (e.g., a smaller radius curvature region) than the second movement pathway 222. Further, in this example, the first movement pathway 220 has a longer path length than the second movement pathway 222.

Figure 5A:
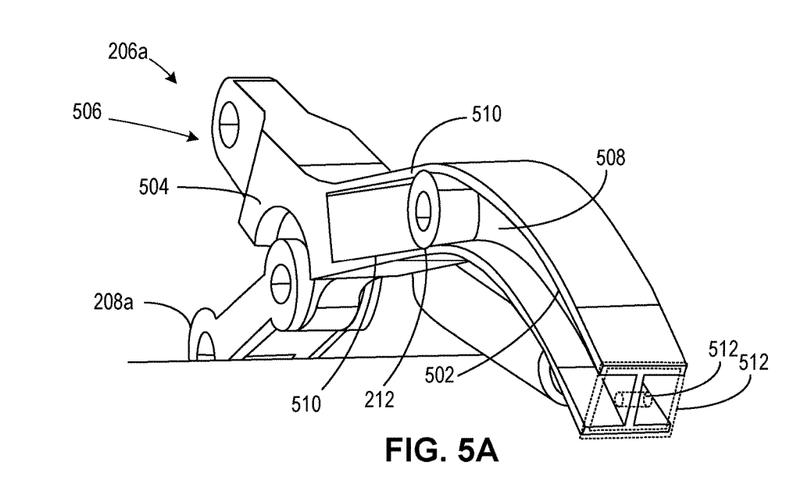
FIGS. 5A and 5B depict an example track geometry that can be implemented in examples disclosed herein.
Figure 5B:
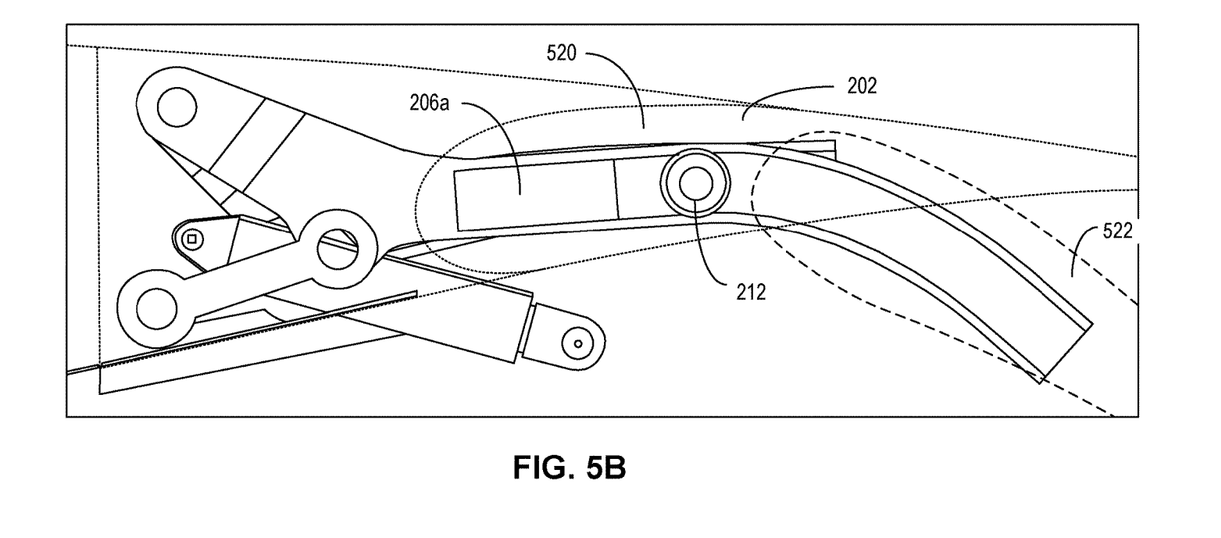

FIGS. 5A and 5B depict an example track geometry that can be implemented in examples disclosed herein. For simplicity, the example track 206a is depicted. However, example aspects and/or features shown in connection with FIGS. 5A and 5B can also be implemented in the example outer track 206b. Turning to FIG. 5A, a detailed view of the inner track 206a is shown. In this example, the example inner track 206a is depicted with the link 208a and the roller 212 (without the control surface 202 for enhanced clarity). The example track 206a includes a curved portion (e.g., an arcuate portion, a curved segment, etc.) 502, a body 504 and a mount 506. In turn, the example body 504 includes a groove 508 with flanges 510 to receive the roller 212 so that the roller 212 can be guided to move therethrough. In this example, the groove 508 and the flanges 510 define a rectangular cross-sectional profile to receive and support the roller 212. However, any other appropriate cross-sectional profile shape can be implemented instead (e.g., a triangular profile shape, an oval profile shape, a slotted profile shape, etc.). In some examples, a stop 512 (e.g., a barrier, a wall, a pin, etc.) is implemented to prevent further motion of the roller 212 beyond a range of motion of the control surface 202. Additionally or alternatively, the roller 212 includes a taper along a longitudinal direction thereof to facilitate retention thereof in the groove 508, for example.

As mentioned above, the outer track 206b (shown in FIGS. 2-4) exhibits similar overall shape/geometric characteristics to the inner track 206a, but is shaped differently. In particular, the outer track 206b exhibits a different overall curvature and/or geometry, and a different path length from the inner track 206a. Further, the outer track 206b has a different fore/aft roller placement in comparison to the inner track 206a. In other words, the rollers 212 can be placed in staggered positions across a fore/aft direction (e.g., a chordwise direction) of the control surface 202 (e.g., the rollers 212 remain staggered in the fore/aft direction across a range of motion of the control surface 202).

Turning to FIG. 5B, a side view of the inner track 206a is shown. In the illustrated example of FIG. 5B, the control surface 202 is depicted in an undeployed position 520 with a deployed position 522 overlayed thereon. In this example, the control surface 202 both translates and pivots as the rollers 212 move along the inner tracks 206a, as well as the outer tracks 206b shown in FIGS. 2-4.

Some examples disclosed herein can be implemented for relatively complex motions of the control surface 202 across multiple degrees of freedom. In particular, some examples disclosed herein enable motion of the control surface 202 that would not be typically enabled or would require relatively complex mechanisms. Further, as can be seen in FIG. 5B, the relatively compact implementation of the tracks 206a, 206b enables a relatively compact and lightweight drive/movement assembly compared to known implementations, thereby enabling relatively related smaller associated accompanying components, such as fairings, with favorable aerodynamic geometries and, as a result, a reduced overall drag coefficient of the aircraft 100.

Figure 6A:
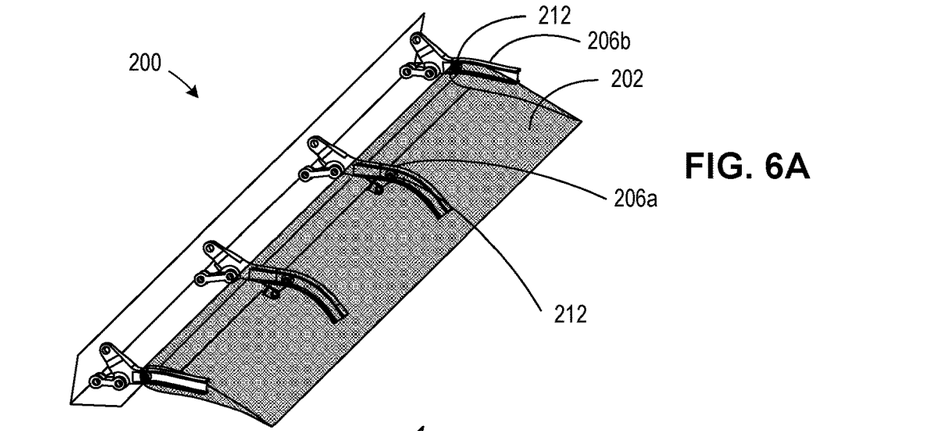
FIGS. 6A-6C depict example movement of the example aerodynamic body.
Figure 6B:
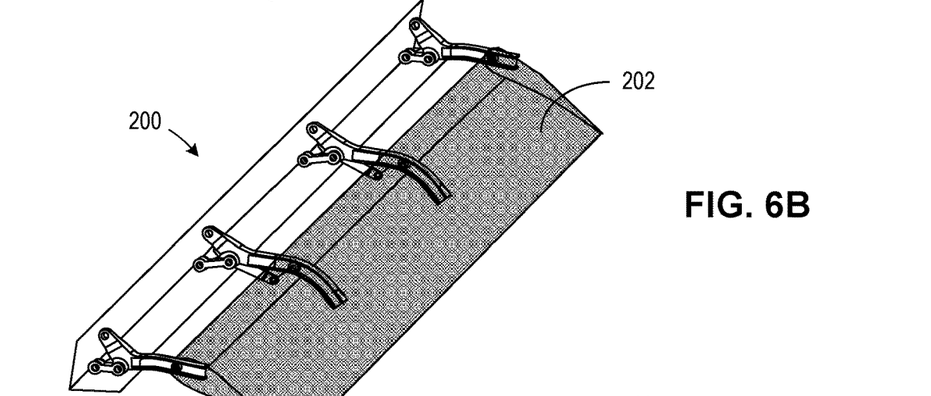
Figure 6C:
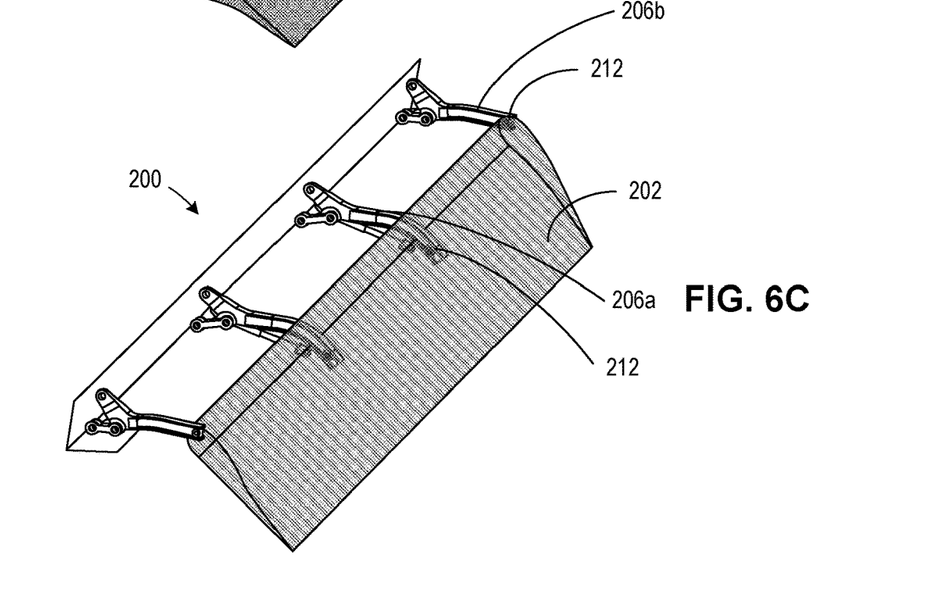

FIGS. 6A-6C depict example motion of the aerodynamic body 200. In particular, FIGS. 6A-6C illustrate example displacement of the control surface 202 during a motion from its stowed/undeployed position to its deployed/angled position.

FIG. 6A depicts the example aerodynamic body 200 in an undeployed (e.g., stowed) position. In this example, the control surface 202 is in its default position such that the control surface 202 is neither translated nor pivoted relative to its default position. Further, the rollers 212 are positioned near proximal ends of the inner tracks 206a, as well as proximal ends of the outer tracks 206b.

FIG. 6B depicts the example aerodynamic body 200 in a partially deployed position. In the illustrated example of FIG. 6B, the control surface 202 is shown in an intermediate position between the undeployed and deployed positions thereof.

FIG. 6C depicts the example aerodynamic body 200 in a fully deployed position. In this example, the control surface 202 is shown at its furthest aft position. Further, the rollers 212 are positioned near distal ends of the inner tracks 206a, as well as distal ends of the outer tracks 206b.

Figure 7:
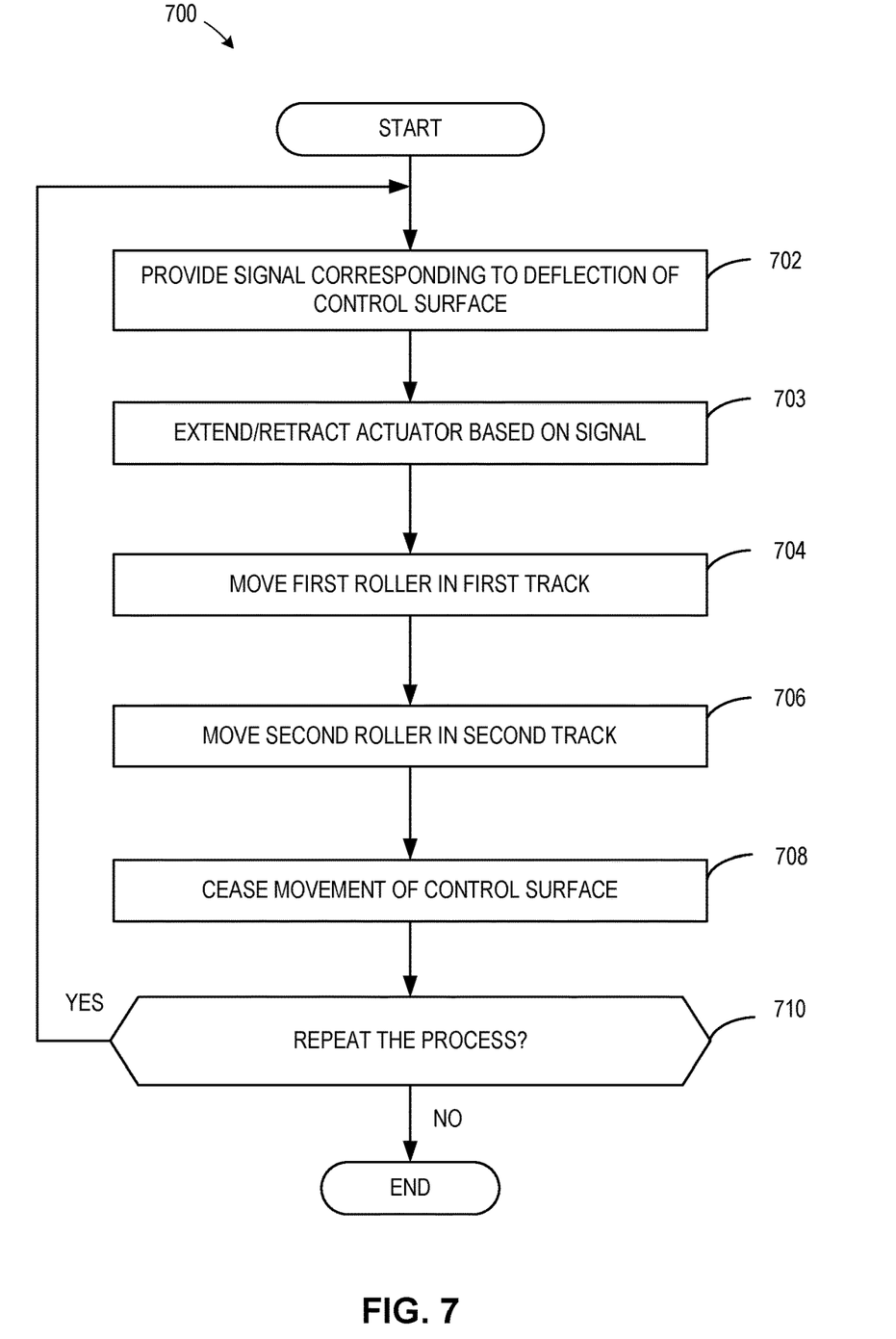
FIG. 7 is a flowchart representative of an example method to implement examples disclosed herein.

FIG. 7 is a flowchart representative of an example method 700 to implement examples disclosed herein. In this example, the aircraft 100 is in flight and the control surface 202 is to be moved to affect overall movement and/or speed of the aircraft 100.

At block 702, in some examples, a signal corresponding to deflection of the control surface 202 is provided to the actuator 210.

At block 703, the actuator 210 responds to the signal by extending/retracting.

At block 704, in response to the extension/retraction of the actuator 210 (block 703), a first one of the rollers 212 is moved in the first track 206b. Particularly, the first one of the rollers 212 is moved along the first movement pathway defined by the first track 206a. As a result, the control surface 202 is driven to move based on the first movement pathway 220 by the actuator 210, which is proximate to or aligned with the first one of the rollers 212.

At block 706, a second one of the rollers 212 is moved in the second track 206b. In particular, the second one of the rollers is moved along the second movement pathway 222 defined by the second track 206b. In this example, the second one of the rollers 212 is offset in an aft or fore direction (e.g., a chordwise direction) from the aforementioned first one of the rollers 212.

At block 708, in some examples, movement of the control surface 202 is ceased. This may occur based on the actuator 210 being commanded to a stop, thereby causing the control surface 202 and the rollers 212 to also stop. In some other examples, the roller 212 contacting the stop 512 or the control surface 202 reaching an end of its range of motion ceases motion of the control surface 202 (e.g., the control surface 202 is stopped after contacting a surface and/or component that at least partially defines a range of motion of the control surface 202).

At block 710, it is determined whether to repeat the process. If the process is to be repeated (block 710), control of the process returns to block 702. Otherwise, the process ends. This determination may be based on whether the aircraft 100 is still in flight or if additional movement of the control surface 202 is desired and/or necessitated.

Example methods, apparatus, systems, and articles of manufacture to enable compact aerodynamic structures, such as fairings for example, are disclosed herein. Further examples and combinations thereof include the following:

Example 1 includes a support structure, a control surface movable relative to the support structure, the control surface including at least two rollers spaced apart along at least a spanwise direction of the aerodynamic body, and at least two tracks associated with the support structure, wherein a first track is to guide a first roller along a first movement pathway, and wherein a second track is to guide a second roller along a second movement pathway shaped differently than the first movement pathway.

Example 2 includes the aerodynamic body as defined in example 1, wherein the control surface includes four rollers such that two of the rollers are positioned at spanwise ends of the control surface and two of the rollers are positioned at an intermediate portion of the control surface.

Example 3 includes the aerodynamic body as defined in example 2, further including at least two actuators operatively coupled to the control surface at the intermediate portion of the control surface.

Example 4 includes the aerodynamic body as defined in any of examples 1 to 3, wherein the first movement pathway has less curvature than the second movement pathway.

Example 5 includes the aerodynamic body as defined in any of examples 1 to 4, further including an actuator operatively coupled to the control surface to move the control surface as the first roller is guided by the first track and the second roller is guided by the second track.

Example 6 includes the aerodynamic body as defined in any of examples 1 to 5, wherein at least two of the rollers are separated in a chordwise direction of the control surface across a range of motion of the control surface.

Example 7 includes the aerodynamic body as defined in any of examples 1 to 6, wherein the aerodynamic body is a wing and the control surface is a flap.

Example 8 includes a method of moving a control surface of an aerodynamic body relative to a support structure of the aerodynamic body, the method comprising moving a first roller of the control surface along a first movement pathway defined by a first track, and moving a second roller of the control surface along a second movement pathway shaped differently than the first movement pathway, the second movement pathway defined by a second track, the second roller displaced from the first roller along at least along a spanwise direction of the aerodynamic body.

Example 9 includes the method as defined in example 8, wherein the first roller is moved along a spanwise end of the control surface and the second roller is moved at an intermediate portion of the control surface.

Example 10 includes the method as defined in example 9, wherein the spanwise end is a first spanwise end, and further including moving a third roller of the control surface along a third movement pathway shaped identical to the first movement pathway, the third roller positioned at a second spanwise end of the control surface that is opposite of the first spanwise end.

Example 11 includes the method as defined in any of examples 8 to 10, wherein the first roller is moved along the first movement pathway having less curvature than the second movement pathway along which the second roller is moved.

Example 12 includes the method as defined in any of examples 8 to 11, further including causing an actuator to translate the second roller along the second movement pathway while the first roller translates along the first movement pathway in response to displacement of the control surface.

Example 13 includes a system comprising a roller assembly on a control surface of a wing, the roller assembly including an inner roller on an intermediate portion of the control surface, an outer roller on a spanwise end of the control surface, and mounts to support and position the inner and outer rollers on the control surface, and a track assembly on a support structure of the wing, the track assembly including a first track to guide the inner roller along a first movement pathway, and a second track to guide the outer roller along a second movement pathway that is shaped differently from the first movement pathway.

Example 14 includes the system as defined in example 13, wherein the inner roller is a first inner roller, wherein the outer roller is a first outer roller, and wherein the roller assembly further includes a second inner roller to be guided by a third track of the track assembly along the first movement pathway, and a second outer roller to be guided by a fourth track of the track assembly along the second movement pathway.

Example 15 includes the system as defined in example 14, further including at least two actuators operatively coupled to the control surface and positioned proximate the first and second inner rollers.

Example 16 includes the system as defined in any of examples 14 or 15, further including a fairing to house at least one of the second or fourth tracks.

Example 17 includes the system as defined in any of examples 13 to 16, wherein the first movement pathway has a longer path length than the second movement pathway.

Example 18 includes the system as defined in any of examples 13 to 17, further including a first linkage rotatably coupled to the first track and the support structure, and a second linkage rotatably coupled to the second track and the support structure.

Example 19 includes the system as defined in example 18, wherein the first linkage has a different length from the second linkage.

Example 20 includes the system as defined in any of examples 13 to 19, wherein the control surface is a flap.

From the foregoing, it will be appreciated that example systems, methods, apparatus, and articles of manufacture have been disclosed that enable highly compact, lightweight and reliable systems for moving a control surface. Examples disclosed herein can reduce a draft coefficient of an aircraft and, thus, can increase a fuel efficiency of the aircraft.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An aerodynamic body comprising:
   a support structure;
   a control surface movable relative to the support structure, the control surface including at least two rollers spaced apart along at least a spanwise direction of the aerodynamic body;
   at least two tracks associated with the support structure, wherein a first track is to guide a first roller along a first movement pathway, and wherein a second track is to guide a second roller along a second movement pathway shaped differently than the first movement pathway;
   a first linkage rotatably coupled to the first track and the support structure; and
   a second linkage rotatably coupled to the second track and the support structure, wherein the first linkage has a different length from the second linkage.

2. The aerodynamic body as defined in claim 1, wherein the control surface includes four rollers such that two of the rollers are positioned at spanwise ends of the control surface and two of the rollers are positioned at an intermediate portion of the control surface.

3. The aerodynamic body as defined in claim 2, further including at least two actuators operatively coupled to the control surface at the intermediate portion of the control surface.

4. The aerodynamic body as defined in claim 1, wherein the first movement pathway has less curvature than the second movement pathway.

5. The aerodynamic body as defined in claim 1, further including an actuator operatively coupled to the control surface to move the control surface as the first roller is guided by the first track and the second roller is guided by the second track.

6. The aerodynamic body as defined in claim 1, wherein at least two of the rollers are separated by a distance in a chordwise direction of the control surface across a range of motion of the control surface.

7. The aerodynamic body as defined in claim 1, wherein the aerodynamic body is a wing and the control surface is a flap.

8. A method of moving a control surface of an aerodynamic body relative to a support structure of the aerodynamic body, the method comprising:
   moving a first roller of the control surface along a first movement pathway defined by a first track; and
   moving a second roller of the control surface along a second movement pathway shaped differently than the first movement pathway, the second movement pathway defined by a second track, the second roller displaced from the first roller along at least along a spanwise direction of the aerodynamic body, wherein a first linkage is rotatably coupled to the first track and the support structure; wherein a second linkage is rotatably coupled to the second track and the support structure, and wherein the first linkage has a different length from the second linkage.

9. The method as defined in claim 8, wherein the first roller is moved along a spanwise end of the control surface and the second roller is moved at an intermediate portion of the control surface.

10. The method as defined in claim 9, wherein the spanwise end is a first spanwise end, and further including moving a third roller of the control surface along a third movement pathway shaped identical to the first movement pathway, the third roller positioned at a second spanwise end of the control surface that is opposite of the first spanwise end.

11. The method as defined in claim 8, wherein the first roller is moved along the first movement pathway having less curvature than the second movement pathway along which the second roller is moved.

12. The method as defined in claim 8, further including causing an actuator to translate the second roller along the second movement pathway while the first roller translates along the first movement pathway in response to displacement of the control surface.

13. A system comprising:
    a roller assembly on a control surface of a wing, the roller assembly including:
        an inner roller on an intermediate portion of the control surface,
        an outer roller on a spanwise end of the control surface, and
        mounts to support and position the inner and outer rollers on the control surface;
    a track assembly on a support structure of the wing, the track assembly including:
        a first track to guide the inner roller along a first movement pathway, and
        a second track to guide the outer roller along a second movement pathway that is shaped differently from the first movement pathway;
    a first linkage rotatably coupled to the first track and the support structure; and
    a second linkage rotatably coupled to the second track and the support structure, wherein the first linkage has a different length from the second linkage.

14. The system as defined in claim 13, wherein the inner roller is a first inner roller, wherein the outer roller is a first outer roller, and wherein the roller assembly further includes:
    a second inner roller to be guided by a third track of the track assembly along the first movement pathway; and
    a second outer roller to be guided by a fourth track of the track assembly along the second movement pathway.

15. The system as defined in claim 14, further including at least two actuators operatively coupled to the control surface and positioned proximate the first and second inner rollers.

16. The system as defined in claim 14, further including a fairing to house at least one of the second or fourth tracks.

17. The system as defined in claim 13, wherein the first movement pathway has a longer path length than the second movement pathway.

18. The system as defined in claim 13, wherein the control surface is a flap.

19. The aerodynamic body as defined in claim 1, wherein the first movement pathway has a longer path length than the second movement pathway.

20. The system as defined in claim 13, wherein the inner roller and the outer roller are staggered along a chordwise direction of the control surface.

* * * * *